June 7, 1966 C. B. KREKELER 3,254,922
RELEASABLE CONSTRUCTION FOR RETAINING CUTTING
ELEMENTS IN SOCKET MEMBERS
Filed Aug. 14, 1961 2 Sheets-Sheet 1

INVENTOR.
CLAUDE B. KREKELER,
BY *Allen & Allen*
ATTORNEYS

June 7, 1966 C. B. KREKELER 3,254,922
RELEASABLE CONSTRUCTION FOR RETAINING CUTTING
ELEMENTS IN SOCKET MEMBERS
Filed Aug. 14, 1961 2 Sheets-Sheet 2

INVENTOR.
CLAUDE B. KREKELER,
BY *Allen & Allen*
ATTORNEYS.

United States Patent Office 3,254,922
Patented June 7, 1966

3,254,922
RELEASABLE CONSTRUCTION FOR RETAINING CUTTING ELEMENTS IN SOCKET MEMBERS
Claude B. Krekeler, Cincinnati, Ohio, assignor to The Cincinnati Mine Machinery Co., Cincinnati, Ohio, a corporation of Ohio
Filed Aug. 14, 1961, Ser. No. 131,284
14 Claims. (Cl. 299—92)

This application is a continuation-in-part of the copending application of the same inventor, Serial No. 659,562, filed May 16, 1957, which matured into Patent 2,996,291 on August 15, 1961.

This invention has to do with the problems involved in the engagement and release of the shanks of cutting tools or cutting tool holders, with respect to socket members (sometimes called lugs or blocks) particularly in mining machinery, although the utility of the invention is not necessarily confined thereto.

The socket members may form parts of cutting chains, or they may form parts of cutting heads, depending upon the type of mining machinery involved. The original mode of retaining the shanks of the cutting elements in the perforations of the socket members, namely, by the use of set screws, is inconvenient, impositive and costly since a very great deal of time is consumed in removing worn bits and replacing them with new ones.

Much work has been done recently in the provision of resiliently acting means in connection with the socket members such as will permit used bits to be pried out and fresh bits to be driven into the socket members without further manipulations. In one form, the previously suggested devices have included plungers operating in a socket member transverse the shank-receiving perforation. The plunger is provided with a nose which engages in the shank of the tool, and the plunger is resiliently urged toward the shank.

Such structures embody certain difficulties. Spring means located within the hole cannot be relied upon because fine cuttings enter the space housing the spring and pack therein, immobilizing the spring. Successful devices have been made using rubbery substances in certain configurations as a means for urging the plunger elements resiliently in a direction toward the shank.

It is a primary object of this invention to provide resiliently actuated plungers in a new, simplified and cheaper construction while avoiding the difficulties arising from the packing of fine cuttings and the action of corrosive mine waters.

It is an object of the invention to provide a simplified construction in which both the plungers and the resilient actuating means may be readily replaced or renewed when this becomes necessary.

It is also an object of the invention to provide a simplified means for preventing the plunger end from passing too far into the shank receiving perforation in the socket member.

These and other objects of the invention which will be set forth hereinafter or will be apparent to one skilled in the art upon reading these specifications, are accomplished by that construction and arrangement of parts of which certain exemplary embodiments will now be described.

Reference is made to the drawings accompanying this application wherein.

Briefly in the practice of the invention use is made of a plunger sliding in a hole in the socket member transverse to the shank-receiving perforation. The plunger, however, extends throughout the effective length of the hole and the resilient substance in the form of a block is either located beyond the outer periphery of the socket member, or in a groove in an outer surface of the socket member but, in either event, is accessible from the outside of the socket member. This not only permits ready renewal of the resilient substance but provides also for the expansion of the resilient substance in a direction or directions transverse the compressive forces exerted on it by the plunger. Provision is also made for a novel interengagement of the plunger and the block of resilient substance so that the position of the nose of the plunger within the socket member is controlled.

The plungers of this invention are generally made of metal such as steel; but they can be made of any substance of sufficient hardness and durability. Such substances are inclusive of a number of the relatively hard and tough plastic materials of commerce such as nylon, Teflon, the urethanes and poly-urethanes, and the like. The rubbery resilient substances which may be employed in the practice of the invention are inclusive of natural rubber, any of the synthetic rubbers, chloroprenes, such as neoprene, and the like.

Figure 1:
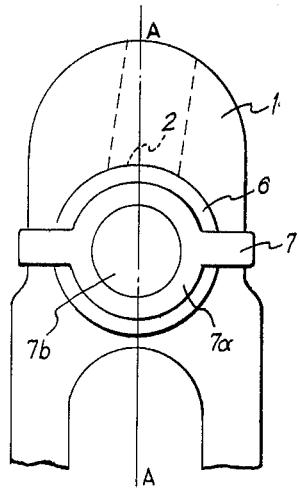
FIGURE 1 is an end elevation of a socket member embodying one aspect of the invention.
Figure 2:
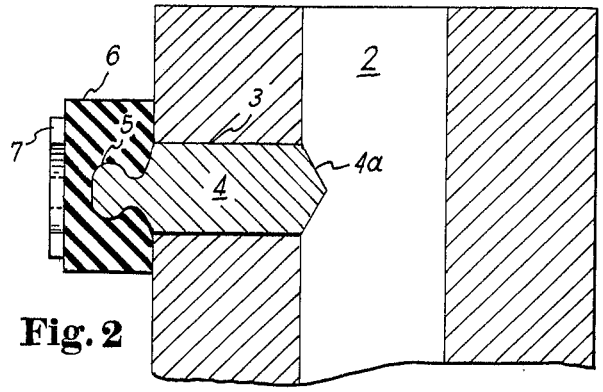
FIGURE 2 is a longitudinal sectional view thereof taken along the section line A—A of FIGURE 1.

Referring to FIGURES 1 and 2, the socket member 1 has a perforation 2 for accepting the shank of a cutter bit or cutter bit holder. A hole 3 extends from the outside surface of the socket member and intersects the perforation 2. A plunger 4 operates within this hole, and has a nose 4a extending into the perforation. The precise shape of the nose is not a limitation on the invention. Usually, however, the nose will be conical and adapted to engage the lower surface of a notch in the shank of a cutting tool as hereinafter explained. The other end of the plunger is configured as shown at 5 to present a bulbous outer end connected to the body of the plunger by a relatively more slender cylindrical neck. The object of this configuration is to effect a connection between the plunger and a block 6 of rubbery resilient substance which, in the exemplary embodiment lies outside the socket member. The block of resilient substance has a recess appropriately shaped to receive the configuration 5 on the plunger with a snap-in fit. As will be evident to the skilled worker after reading these specifications, other configurations of the element 5 and the recess in the block 6 may be employed, the object being to effect a detachable connection between the block and the plunger. But since the block is larger in external dimensions than the hole 3, it will be evident that the block controls the distance to which the plunger 4 can move to the right in FIGURE 2, and thus insures that the nose 4a will lie in the proper position within or partly within the perforation 2. While the plunger 4 will normally be circular in cross section, it may have other shapes such as square or rectangular; but any shape chosen must be so controlled as to dimensions that the nose 4a will enter the perforation 2.

To cause the block 6 of resilient substance to urge the plunger toward the perforation if it should be moved in the opposite direction, there is shown a strap member 7 lying against the outer face of the block. For a reason hereinafter set forth, the central portion of this strap member is preferably made in the form of a ring 7a, having a central orifice 7b. Legs of the strap member are bent over and fastened against the outer surfaces of the socket member as most clearly shown at 7c in FIGURE 4. The fastening may be done in any desired way as by the use of screws, but it is also satisfactory to weld these legs to the socket member. While the construction including the plunger, the block of resilient substance and the retainer 7 has been shown at an end of the socket member, it is within the spirit of the invention to provide analogous constructions including plungers extending into the shank receiving perforation from one or both sides of the socket member.

Figure 4:
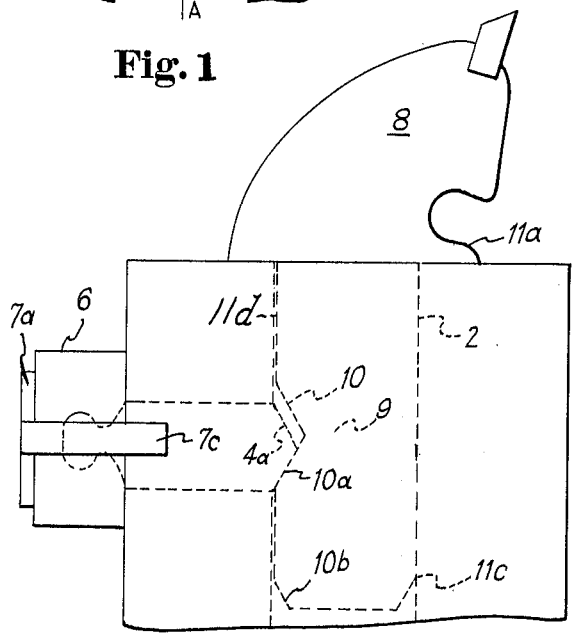
FIGURE 4 is a side elevation of a socket member and a cutting bit in assembly.
Figure 3:
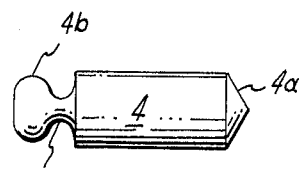
FIGURE 3 is an elevational view of a plunger which may be used in practicing the invention.
Figure 5:
FIGURE 5 is an elevational view of a plunger which may be used in another embodiment of the invention, viz., that of FIGURES 7 and 8.
Figure 6:
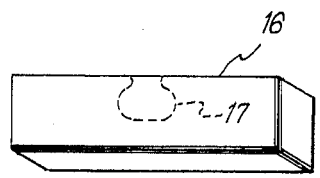
FIGURE 6 is a perspective view of a block of rubbery resilient substance which may be employed in the same embodiment.

In FIGURE 4 a cutting bit having a head 8 and a shank 9 is shown in assembly with the socket member. The shank is provided with a notch 10 having a lower operating surface 10a. The lower rear edge of the shank is chamfered as at 10b. It will be clear that when the shank 9 is inserted in the perforation 2 and the bit driven downwardly, the chamfered surface 10b will first depress the nose 4a of the plunger, moving the plunger to the left in the Figure and compressing the resilient substance of the block 6. Further movement of the shank 9 into the perforation will permit the nose of the plunger to engage the operating surface 10a of the notch. The notch is preferably made deeper than that portion of the nose of the plunger which extends into the perforation 2. Thus the plunger can exert a downward as well as a forward force on the shank 9; and the bit shank can assume a favorable position for resisting the strains of cutting inasmuch as the lower front edge of the shank can contact the forward edge of the perforation as at 11c, and the upper rear edge of the shank can contact the upper rear portion of the perforation as at 11d. The distance to which the shank can enter the perforation is limited as at 11a and 11d by the engagement of abutments on the bit with the top edge portions of the socket member.

Another form of the invention is shown in FIGURES 5 to 9 inclusive. Here the socket member 12 having the shank receiving perforation 13 is provided with a groove 14, in that face of the member from which the hole 15 extends inwardly. Use is made in this instance of a block 16 of resilient substance shaped to lie within the groove and provided with recess 17 to accept the bulbous connecting portion of the plunger. The plunger will in this instance usually be shorter as indicated at 18 in FIGURE 5. Instead of the strap arrangement hereinabove described, use may be made of a plate 19 larger in dimensions than the transverse width of the groove. Preferably the plate will have a central opening 20. The plate may in this instance be attached directly to the socket member by screws 21 or in any other suitable way.

Figure 7:
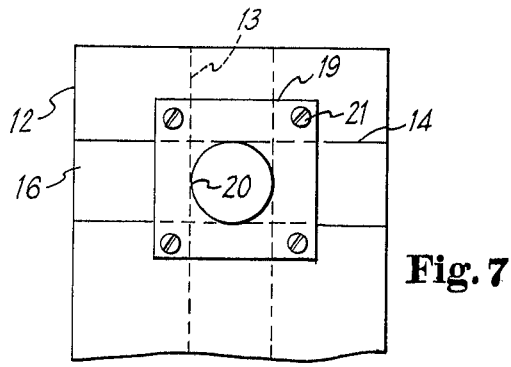
FIGURE 7 is an end elevation of a socket member embodying the second modification of the invention.
Figure 8:
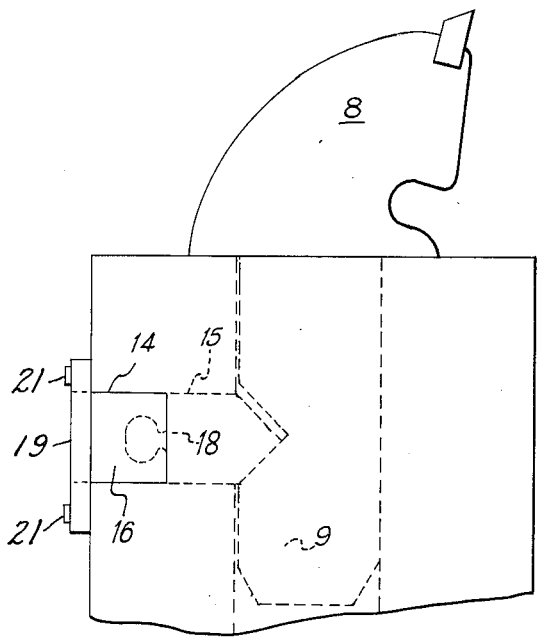
FIGURE 8 is a side elevation of a block and cutter bit in assembly, in accordance with the same modification.
Figure 9:
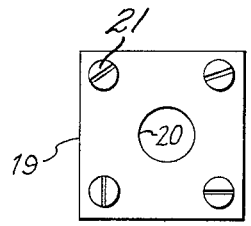
FIGURE 9 is a plan view of a retaining plate for the resilient block.

In the structure of FIGURE 1, the block 6 rubbery resilient substance is free on all of its side edges. In the structure of FIGURES 7 and 8, the block 16 lies within the groove; but its end portions are free. As a consequence, in both types of structure when the block is compressed transversely by movement of the plunger to the left, it is free to expand laterally. The force exerted upon the plunger by the rubbery resilient substance can be controlled by the state of hardness of the substance itself, i.e., the degree of vulcanization or cure. In each instance it will be seen that while the block does not operate within the hole 3 or 15, it effectively closes off the hole to the entrance of fine cuttings or corrosive mine waters. When it becomes necessary to change plungers or to renew the blocks of rubbery resilient substance, this may be done quite readily by placing a tool against the outer side of the block (as in the openings 7b or 20), and subjecting the tool to a blow or pressure so as to distort the rubbery resilient substance enough to permit the disengagement of the bulbous portion of the plunger from the corresponding recess in the rubbery block. It is not necessary that the block be perforated to permit engagement of the tool directly with the bulbous portion of the plunger, although this may be done if desired. When the plunger has been disengaged from it, the block of resilient substance may be removed by a lateral motion from beneath either the strap 7 or the plate 19, as the case may be. It will also be possible to withdraw the plunger from the socket member through the openings 7b or 20.

Figure 10:
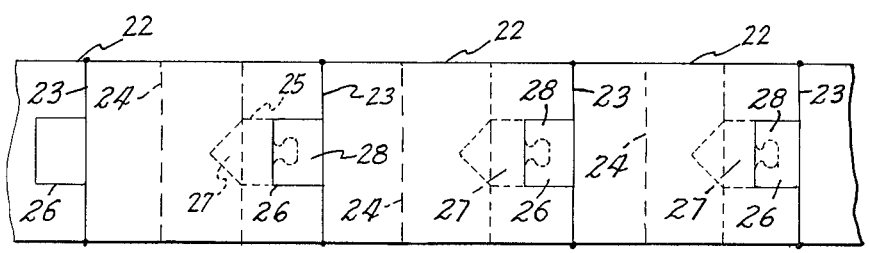
FIGURE 10 is an elevational view of a series of socket members joined together as in a cutting head.

In FIGURE 10 a plurality of socket members 22 are shown in juxtapositioned relationship with their meeting surfaces fastened together as by welding at 23. Each of the socket members will have a shank receiving perforation 24, an intersecting hole 25 and a groove 26. It will be understood from this figure how the plunger element 27 coact with blocks 28 of rubbery resilient substance inserted laterally into the grooves 26. The structure shown in FIGURE 10 is one which may be employed in providing a plurality of socket members on a cutter head.

Figure 11:
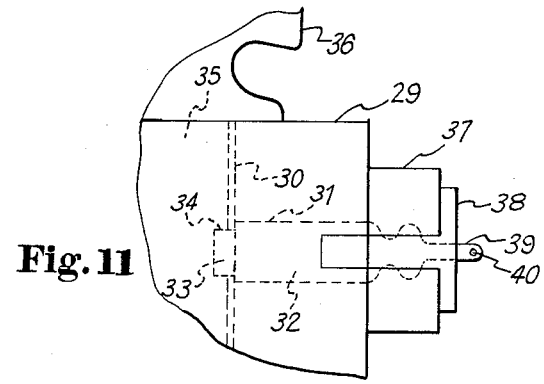
FIGURE 11 is a partial elevational view showing yet another form of resilient means.

The utility of certain aspects of this invention is not confined to knock-in pry-out structures. For example, as shown in FIGURE 11, a socket member 29 having a shank receiving perforation 30, and a lateral hole 31 may be provided with a plunger 32 which has a flat nose 33 engaging in a substantially rectangular notch 34 in the shank 35 of a cutting tool 36. The plunger in this instance has the same type of bulb-in-recess engagement with the block 37 of resilient substance which again is retained by a strap member 38 like that of FIGURE 1, but the bulbous portion of the plunger has an extension 39 passing through a hole in the block 37 and provided at its end with a means such as a hole 40 by which a tool may engage it. In this instance a prying tool will be employed to move the plunger to the right in FIGURE 11 until the plunger nose 33 is disengaged from the groove 34, after which the cutting tool 36 may be lifted or pried out of the socket member.

In the claims which follow the term "uncovered" as applied to a surface portion of the resilient body means that the said surface portion is open to the atmosphere outside the socket member either at or beyond the surface of the socket member or within an opening therein so that mine cuttings collecting against the said surface portion of the resilient body can be freely displaced upon movement of the said surface portion.

Modifications may be made in the invention without departing from the spirit of it. The invention having been described in certain exemplary embodiments, what is new and desired to be secured by Letters Patent is:

1. A socket member having a body with an outer surface and a shank-receiving perforation, there being an opening in said socket member having a portion intersecting said perforation, a shank engaging device movable longitudinally within said portion and having an end part entering said perforation and movable therein for the engagement and disengagement of the shank of a cutting tool, a body of resilient substance associated with said shank engaging device, means for holding at least a part of said body of resilient substance in a fixed relationship with respect to said perforation and so related to the said shank engaging means that when said shank engaging means is moved in a direction to release the shank in said perforation a portion at least of said body of resilient substance will be subject to a compressive force between said shank engaging means and said holding means resulting in a distortion of said resilient substance, said body of resilient substance having an unrestricted and uncovered surface portion to allow deformation thereof upon enforced movement of said shank engaging means.

2. The structure claimed in claim 1 wherein the said unrestricted and uncovered surface portion of said resilient body is so located as to allow distortion of said resilient body in a direction other than the direction of said compressive force.

3. A socket member having a body with an outer surface and a shank-receiving perforation, there being a transverse hole in said socket member extending from said outer surface and intersecting said perforation, a shank engaging means movable within said hole and having a nose portion entering said perforation, a block of resilient substance covering the terminus of said hole at the outer surface of said socket member, and a fixed means for holding said block in place against the surface of said socket member whereby movement of said shank-engaging means in said hole so as to decrease the projection of said nose portion into said perforation results in a resilient compression of said block against said holding means, said block having at least one unrestricted and uncovered surface to permit expansion thereof.

4. The structure claimed in claim 3 in which said block has at least one unrestricted and uncovered surface so located as to permit expansion of said block in a direction other than the direction of said compression.

5. The structure claimed in claim 3 wherein said shank-engaging means is in the form of a plunger.

6. The structure claimed in claim 3 including means for attaching said plunger to said block.

7. The structure claimed in claim 6 wherein said means for attaching said plunger to said block comprises an under-cut protuberance on the end of said plunger and a corresponding recess in said block to receive said protuberance.

8. The structure claimed in claim 7 wherein the means for holding said block against the surface of said socket member is a strap means having a portion lying against said block and at least one other portion attached to said socket member.

9. The structure claimed in claim 7 wherein the means for holding said block against the surface of said socket member is a strap means having a portion lying against said block and at least one other portion attached to said socket member, there being a hole in said strap means substantially coaxial with said under-cut protuberance whereby said block may be distorted from the outside to release the attachment between said plunger and said block.

10. A socket member for the purpose described comprising a body having a shank receiving perforation, said body also having a hole intersecting said perforation for the reception of a plunger member, and fixed means in connection with said socket member for holding a block of resilient substance against the outer terminus of said hole, said means configured to leave a portion of said block unrestricted and uncovered whereby to allow resilient distortion thereof.

11. The structure claimed in claim 10 wherein said last mentioned means is a strap member having legs attached to said body and a central portion for engaging said block of resilient substance.

12. The structure claimed in claim 10 wherein said last mentioned means is a strap member having legs attached to said body and a central portion for engaging said block of resilient substance, there being a perforation in said strap member in substantial alignment with said hole.

13. The structure claimed in claim 1 wherein a part of said opening extends inwardly from an end portion of said socket member.

14. The structure claimed in claim 13 wherein said shank engaging portion is of metal.

References Cited by the Examiner

UNITED STATES PATENTS

| | | | |
|---|---|---|---|
| 510,267 | 12/1893 | Kelly | 287—20.5 |
| 1,376,744 | 5/1921 | Conrad | 287—20.5 |
| 2,304,038 | 12/1942 | Thompson. | |
| 2,546,457 | 3/1951 | Launder et al. | 37—142 |
| 2,747,852 | 5/1956 | Krekeler | 262—33 |
| 2,851,295 | 9/1958 | Chaffee. | |
| 2,852,874 | 9/1958 | Grubb | 38—142 |
| 2,907,559 | 10/1959 | Brown et al. | 262—860 |
| 2,965,365 | 12/1960 | Krekeler | 299—92 |
| 2,996,291 | 8/1961 | Krekeler | 262—33 |
| 3,057,609 | 10/1962 | Krekeler | 299—92 |
| 3,063,691 | 11/1962 | Osgood | 262—860 |
| 3,088,721 | 5/1963 | Krekeler | 299—92 |
| 3,114,537 | 12/1963 | Krekeler | 299—92 |
| 3,116,052 | 12/1963 | Osgood | 299—92 |
| 3,127,153 | 3/1964 | Elders | 262—860 |

FOREIGN PATENTS 750,678  6/1956  Great Britain.

CHARLES E. O'CONNELL, *Primary Examiner.*

BENJAMIN HERSH, *Examiner.*

E. R. PURSER, *Assistant Examiner.*